(12) United States Patent
Govardhan

(10) Patent No.: US 11,321,464 B2
(45) Date of Patent: May 3, 2022

(54) METHOD AND SYSTEM FOR GENERATING COGNITIVE SECURITY INTELLIGENCE FOR DETECTING AND PREVENTING MALWARES

(71) Applicant: WIPRO LIMITED, Bangalore (IN)

(72) Inventor: Sridhar Govardhan, Bangalore (IN)

(73) Assignee: Wipro Limited, Bangalore (IN)

( * ) Notice: Subject to any disclaimer, the term of this patent is extended or adjusted under 35 U.S.C. 154(b) by 839 days.

(21) Appl. No.: 15/889,236

(22) Filed: Feb. 6, 2018

(65) Prior Publication Data
US 2019/0197239 A1  Jun. 27, 2019

(30) Foreign Application Priority Data
Dec. 22, 2017 (IN) .............................. 201741046343

(51) Int. Cl.
*G06F 21/56* (2013.01)
*G06F 21/55* (2013.01)
(Continued)

(52) U.S. Cl.
CPC .......... *G06F 21/567* (2013.01); *G06F 21/552* (2013.01); *G06F 21/554* (2013.01);
(Continued)

(58) Field of Classification Search
CPC .... G06F 21/567; G06F 21/554; G06F 21/566; G06F 21/568; G06F 2221/034;
(Continued)

(56) References Cited

U.S. PATENT DOCUMENTS 8,370,931 B1    2/2013  Chien et al.
8,401,982 B1 *  3/2013  Satish ................... G06F 21/566
                                                               706/20
(Continued)

FOREIGN PATENT DOCUMENTS

EP    3 038 003    6/2016

OTHER PUBLICATIONS

"Machine Learning Methods for Malware", Nov. 17, 2017, Kaspersky Whitepaper, obtained online from <https://media.kaspersky.com/en/enterprise-security/Kaspersky-Lab-Whitepaper-Machine-Learning.pdf>, retrieved on Oct. 24, 2020.*

(Continued)

*Primary Examiner* — Jeffery L Williams
*Assistant Examiner* — Zhimei Zhu
(74) *Attorney, Agent, or Firm* — Finnegan, Henderson, Farabow, Garrett & Dunner, LLP

(57) ABSTRACT

This disclosure relates to method and system for generating cognitive security intelligence for detecting and preventing malwares. In one embodiment, the method includes monitoring instructions being executed by a processor of a computing system, determining events triggered and activities performed by the execution of the instructions, correlating the events and the activities to determine a sequence of events and activities, and mapping the sequence of events and activities with a topographical threat map to detect a pattern match corresponding to a malware. The topographical threat map is event and activity behavior map of a number of categories of malwares, and is built based on a cognitive analysis using deep learning which may also be enriched with external knowledge or historic knowledge. The method further includes effecting a remedial measure, upon detecting the pattern match, to prevent the malware by (Continued)

constructing remedial instructions to be executed by the processor.

14 Claims, 6 Drawing Sheets

(51) Int. Cl.
    *H04L 29/06*     (2006.01)
    *G06N 20/00*     (2019.01)

(52) U.S. Cl.
    CPC ........... *G06F 21/566* (2013.01); *G06N 20/00* (2019.01); *H04L 63/1416* (2013.01); *G06F 21/568* (2013.01); *G06F 2221/034* (2013.01)

(58) Field of Classification Search
    CPC ......... G06F 21/52–561; G06F 11/3072; G06N 20/00; H04L 63/14–1475
    See application file for complete search history.

(56) References Cited

U.S. PATENT DOCUMENTS

| | | | |
|---|---|---|---|
| 9,317,686 B1 | 4/2016 | Ye et al. | |
| 9,516,053 B1 | 12/2016 | Muddu et al. | |
| 9,734,337 B1 | 8/2017 | Patton et al. | |
| 10,282,546 B1* | 5/2019 | Parikh | G06N 3/08 |
| 10,491,502 B2* | 11/2019 | Gao | H04L 43/12 |
| 2007/0136455 A1* | 6/2007 | Lee | G06F 21/564 |
| | | | 709/223 |
| 2011/0191850 A1* | 8/2011 | Turbin | G06F 21/56 |
| | | | 726/24 |
| 2014/0090061 A1* | 3/2014 | Avasarala | G06F 21/56 |
| | | | 726/24 |
| 2014/0181971 A1 | 6/2014 | Tatarinov et al. | |
| 2015/0230108 A1* | 8/2015 | Sridhara | G06F 21/552 |
| | | | 455/405 |
| 2017/0013002 A1* | 1/2017 | Stevenson | H04L 63/1433 |
| 2017/0262633 A1* | 9/2017 | Miserendino | G06F 21/564 |
| 2018/0004942 A1* | 1/2018 | Martin | H04L 63/1425 |
| 2018/0295147 A1* | 10/2018 | Haga | H04W 4/40 |
| 2019/0102554 A1* | 4/2019 | Luo | G06F 21/554 |
| 2019/0138727 A1* | 5/2019 | Dontov | G06F 21/554 |

OTHER PUBLICATIONS

Extended European Search Report issued in the European Patent Office in counterpart European Application No. 18162467.7, dated Sep. 6, 2018, 9 pages.

* cited by examiner

METHOD AND SYSTEM FOR GENERATING COGNITIVE SECURITY INTELLIGENCE FOR DETECTING AND PREVENTING MALWARES

TECHNICAL FIELD

This disclosure relates generally to information security, and more particularly to method and system for generating cognitive security intelligence for detecting and preventing malwares.

BACKGROUND

Digital devices, including, for example, computers, notebook computers, laptops, tablet devices, smart phones, servers, have become ubiquitous in recent years. In an increasingly digital world, these digital devices may be communicatively connected to a computer network to exchange information, and may, therefore, be prone to more frequent and sustained malware attacks. Thus, information security is an integral aspect of the digital computing devices, and encompasses any means (i.e., devices or activities) designed to protect the digital devices from digital attacks and data theft. These devices and activities may protect the usability, reliability, integrity, and safety of the digital devices and the stored data.

Until few years ago, a malware was construed as nuisance by smaller enterprises, and security threat for large enterprises due to its limited impact on employee productivity and potential data loss. However, this perception has changed considerably and any security breach has a serious impact on individual users as well as businesses. In recent years, malwares have undergone significant changes and have taken different avatars from their traditional approach of being stealthy. Today one of the fastest growing cybercrimes is 'ransomwares' that, upon successful infection, perform unsolicited encryption of computer files (e.g., documents, photos, music, structured files, unstructured files, specified target files, etc.) in a computer system of a user or an organization, and subsequently demand a ransom from the user or the organization (through a note using image or text file message) to recover or access the files. Online services provided by hackers (i.e., ransomware as a service (RaaS)) have further catapulted this nuisance and resulted in a sharp increase in ransomware attacks, thereby making it one of the biggest online cybercrimes. As per a study, in last two years, ransomware victims have paid more than USD 25 million in ransoms, making the ransomware most destructive cybercrime attack.

Several techniques exist to provide information security. However, current techniques for detecting and preventing malwares, and more particularly ransomwares, are limited in their effectiveness. For example, malwares belonging to ransomware family may employ strongest encryption algorithm and encryption key for encrypting system files, system configuration, or system settings, thereby making it difficult to break. Additionally, along with encrypting files, ransomwares may also scramble file names, thereby making it difficult to identify lost files and plan for backup restoration. Further, ransomwares typically use complex set of evasion techniques to go undetected by current security solutions. Current security solutions typically employ pre-defined signatures of malwares to detect and quarantine malwares. In other words, continuously evolving nature of malwares, their multiple variations, and their usage of legitimate system files and processes may make effective detection and prevention of malwares challenging for the current security solutions.

SUMMARY

In one embodiment, a method for generating cognitive security intelligence for detecting and preventing a malware in a computing system is disclosed. In one example, the method may include monitoring instructions being executed by a processor of the computing system. The method may further include determining a plurality of events triggered by the execution of the instructions and a plurality of activities performed by the execution of the instructions. The method may further include correlating the plurality of events and the plurality of activities to determine a sequence of events and activities. The method may further include mapping the sequence of events and activities with a topographical threat map to detect a pattern match corresponding to a malware. The topographical threat map is event and activity behavior map of a plurality of categories of malwares, and is built based on a cognitive analysis of at least one of external knowledge, or historic knowledge. The method may further include effecting a remedial measure, upon detecting the pattern match corresponding to the malware, to prevent the malware by constructing remedial instructions to be executed by the processor.

In one embodiment, a system for generating cognitive security intelligence for detecting and preventing a malware in a computing system is disclosed. In one example, the system may include at least one processor and a memory communicatively coupled to the at least one processor. The memory may store processor-executable instructions, which, on execution, may cause the processor to monitor instructions being executed by a processor of the computing system. The processor-executable instructions, on execution, may further cause the processor to determine a plurality of events triggered by the execution of the instructions and a plurality of activities performed by the execution of the instructions. The processor-executable instructions, on execution, may further cause the processor to correlate the plurality of events and the plurality of activities to determine a sequence of events and activities. The processor-executable instructions, on execution, may further cause the processor to map the sequence of events and activities with a topographical threat map to detect a pattern match corresponding to a malware. The topographical threat map is event and activity behavior map of a plurality of categories of malwares, and is built based on a cognitive analysis of at least one of external knowledge, or historic knowledge. The processor-executable instructions, on execution, may further cause the processor to effect a remedial measure, upon detecting the pattern match corresponding to the malware, to prevent the malware by constructing remedial instructions to be executed by the processor.

In one embodiment, a non-transitory computer-readable medium storing computer-executable instructions for generating cognitive security intelligence for detecting and preventing a malware in a computing system is disclosed. In one example, the stored instructions, when executed by a processor, may cause the processor to perform operations including monitoring instructions being executed by a processor of the computing system. The operations may further include determining a plurality of events triggered by the execution of the instructions and a plurality of activities performed by the execution of the instructions. The operations may further include correlating the plurality of events and the plurality of activities to determine a sequence of events and activities. The operations may further include mapping the sequence of events and activities with a topographical threat map to detect a pattern match corresponding to a malware. The topographical threat map is event and activity behavior map of a plurality of categories of malwares, and is built based on a cognitive analysis of at least one of external knowledge, or historic knowledge. The operations may further include effecting a remedial measure, upon detecting the pattern match corresponding to the malware, to prevent the malware by constructing remedial instructions to be executed by the processor.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
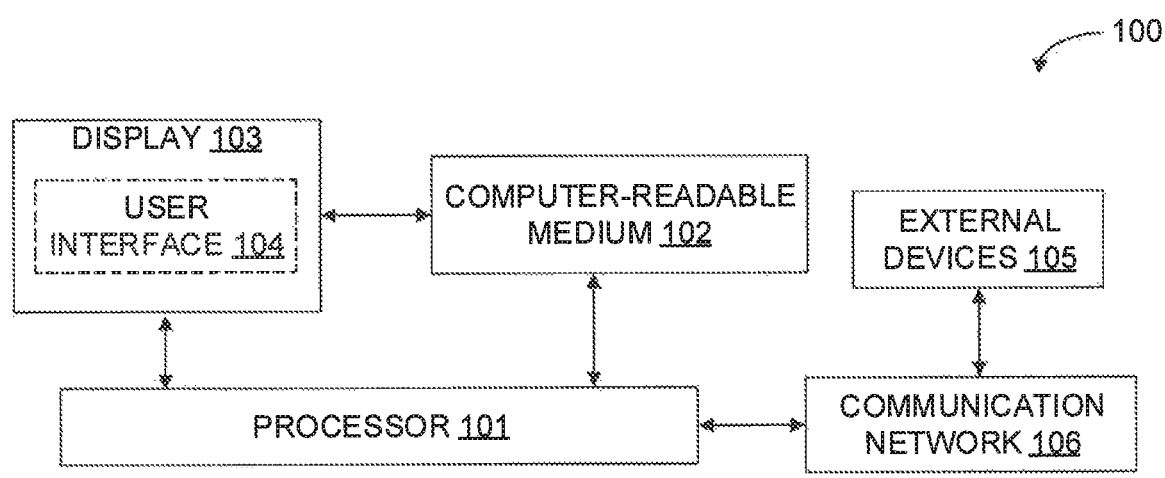
FIG. 1 is a block diagram of an exemplary system for generating cognitive security intelligence for detecting and preventing malwares in accordance with some embodiments of the present disclosure.

Referring now to FIG. 1, an exemplary system 100 for generating cognitive security intelligence for detecting and preventing malwares is illustrated in accordance with some embodiments of the present disclosure. The system 100 may include, but is not limited to, a computer, a notebook, a laptop, a netbook, a tablet, a smart phone, a server, or any other computing device. The malwares may be malicious software codes designed to disrupt, damage, or gain authorized access to a computer system. The malware may include, but is not limited to, a virus, a worm, a Trojan, an adware, a spyware, a ransomware, and so forth. The system 100 may implement a cognitive security device to generate cognitive security intelligence so as to detect and prevent malwares in the system 100. As will be described in greater detail in conjunction with FIGS. 2-5, the cognitive security device may monitor instructions being executed by a processor of the computing system, determine events triggered by the execution of the instructions and activities performed by the execution of the instructions, correlate the events and the activities to determine a sequence of events and activities, map the sequence of events and activities with a topographical threat map to detect a pattern match corresponding to the malware, and effect a remedial measure, upon detecting the pattern match corresponding to the malware, to prevent the malware by constructing remedial instructions to be executed by the processor. It should be noted that the topographical threat map may be event and activity behavior map of different variations of different categories of malwares, and may be built based on a cognitive analysis of at least one of external knowledge, or historic knowledge.

The system 100 may include one or more processors 101, a computer-readable medium (e.g., a memory) 102, and a display 103. The computer-readable storage medium 102 may store instructions that, when executed by the one or more processors 101, cause the one or more processors 101 to generate cognitive security intelligence for detecting and preventing malwares in accordance with aspects of the present disclosure. The computer-readable storage medium 102 may also store various data (e.g., events, activities, sequence of events and activities, topographical threat map, remedial measures, security risk scores, security threat zones, predicted security threat, etc.) that may be captured, processed, and/or required by the system 100. The system 100 may interact with a user via a user interface 104 accessible via the display 103. The system 100 may also interact with one or more external devices 105 over a communication network 106 for sending or receiving various data. The external devices 105 may include, but are not limited to, a remote server, a digital device, or another computing system.

At a broad level, malwares, and in particular ransomwares, may be classified into three groups. For example, a system locker may be a type of malware that may deny access to the system (i.e., computer, digital device, etc.). A system locker ransomware may, therefore, lock the device's user interface and may then demand the victim for the ransom. Examples of system locker may include Crypto-Locker, CryptoWall, CTB-Locker, TeslaCrypt, Locky, WannaCry, and so forth. Similarly, a data locker may be a type of malware that may deny access to the stored data. A data locker ransomware or crypto type of ransomware may, therefore, deny access to files and folders residing in a system. Such malware may typically use strongest encryption algorithm so as to encrypt files and folders. The encryption private key may be withheld as ransom. Further, a service disruptor may be a type of malware that may rewrite boot sectors of a computer's master boot record (MBR). The service disruptor ransomware may, therefore, lock users out of their PCs.

Typically, above-mentioned groups of ransomwares have a common pattern. In particular, the above groups of ransomwares may trigger a similar sequence of events and activities in the computing system 100. The system calls and parameters used in execution of the ransomware may also be similar in nature and operation. These events and activities may be trapped at the processor machine language (ML)

instructions operation code (OPCODE), and may be used for detection and prevention of the ransomwares in accordance with some embodiments of the present disclosure. For example, if the events and activities occur in a sequence that is malicious as detected by the cognitive security device, a remediation measure may be effected. A ML instructs may notify the processor to block or prevent execution of ransomware. Though the present disclosure provides examples generally in context of ransomwares, one of ordinary skill in the art will readily apprehend that the application of these techniques in other contexts, such as for other types of malwares (e.g., virus, worms, Trojans, adwares, spywares, etc.) is well within the scope of the invention.

Figure 2:
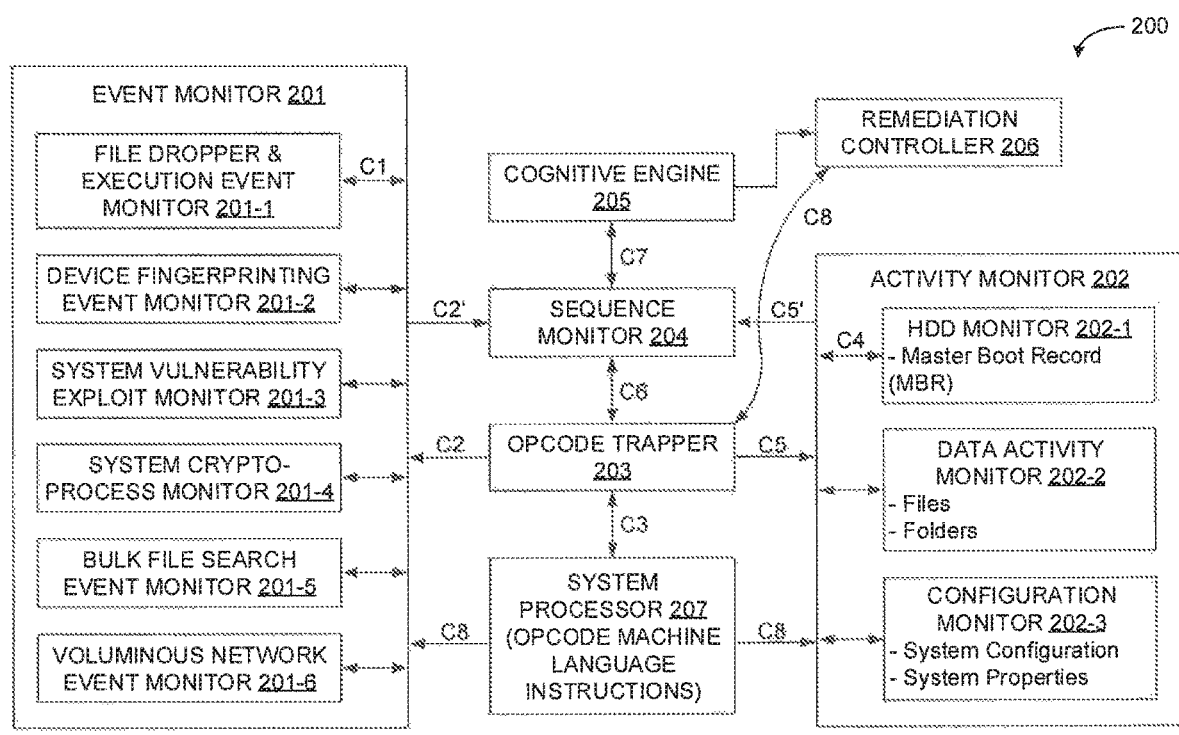
FIG. 2 is a functional block diagram of a cognitive security device in accordance with some embodiments of the present disclosure.

Referring now to FIG. 2, a functional block diagram of the cognitive security device 200 implemented by the system 100 of FIG. 1 is illustrated in accordance with some embodiments of the present disclosure. The cognitive security device 200 may include various modules (e.g., components, engines, controller, etc.) that perform various functions so as to generate cognitive security intelligence for detecting and preventing malwares in the system. In some embodiments, the cognitive security device 200 may include an event monitor 201, an activity monitor 202, an operation code (OPCODE) trapper 203, a sequence monitor 204, a cognitive engine 205, and a remediation controller 206. As will be appreciated by those skilled in the art, all such aforementioned modules 201-206 may be represented as a single module or a combination of different modules. Moreover, as will be appreciated by those skilled in the art, each of the modules 201-206 may reside, in whole or in parts, on one device or multiple devices in communication with each other.

The event monitor 201 may be a software based sensor adapted to primarily collate events triggered by the execution of the instructions in the system processor 207 of the system 100. As will be described below, such events may be captured via the OPCODE trapper 203. In some embodiments, the event monitor 201 may be a base-platform providing interface to multiple micro-sensors including, but not limited to, file dropper and execution event monitor 201-1, device fingerprinting event monitor 201-2, system vulnerability exploit event monitor 201-3, system cryptoprocess event monitor 201-4, bulk file search event monitor 201-5, or voluminous network event monitor 201-6. Additionally, event monitor 201 may provide deep learning capability for specific monitoring and notification of events to the OPCODE trapper 203. The events may include, but are not limited to, device processes, device services, registry, and so forth. Examples of specific events may include, but are not limited to, file dropping and execution, device fingerprinting, system vulnerability exploitation, system cryptic processes, bulk file search, voluminous network events, and so forth.

The activity monitor 202 may be a software based sensor adapted to primarily monitor activities performed on the system 100. As will be appreciated, such activities may be performed by the execution of the instructions in the system processor 207, and captured via the OPCODE trapper 203. In some embodiments, the activity monitor 202 may be a base-platform providing interface to multiple micro-sensors including, but not limited to, storage device (e.g., hard disk drive (HDD)) activity monitor 202-1, data activity monitor 202-2, system configuration and properties activity monitor 202-3, and so forth. Additionally, activity monitor 202 may provide deep learning capability for specific monitoring and notification of activities to the OPCODE trapper 203. The activities may include, but are not limited to, activities performed on storage device (e.g., HDD), data including files and folders, system configuration or properties, and so forth. Examples of specific activities may include, but are not limited to, re-writing boot sectors of the MBR, bulk file extension change, bulk file name change, bulk folder name change, system file zoning flag modification, system boot run registry, deletion of volume shadow copies (quiet mode), modification to security center notifications, disabling of windows error recovery on startup, scheduling of system reboot, and so forth.

The OPCODE trapper 203 may be in direct communication with the system processor 207. The OPCODE trapper 203 may directly monitor instructions being executed by the system processor 207, and, in some embodiments, may replicate the OPCODE as monitored in the system processor 207 to the event monitor 201 as well as the activity monitor 202. Further, the OPCODE trapper 203 may act as proxy to inject OPCODE into the system processor 207 on-behalf of both these monitors 201 and 202. It should be noted that the OPCODE trapper 203 may have capability to execute instructions at a high speed so as to ensure detection and prevention of malwares before any substantial infection or damage takes place.

The sequence monitor 204 may correlate the events and activities reported by the event monitor 201 and the activities monitor 202 either directly or through the OPCODE trapper 203. The sequence monitor 204 may then determine a sequence of events and activities based on the correlation. Further, the sequence monitor may receive a topographical threat map from the cognitive engine 205. As will be described in detail below, the topographical threat map may be event and activity behavior map of different categories of malwares, and may be generated by the cognitive engine 205 based on a cognitive analysis of external knowledge, or historic knowledge. The sequence monitor 204 may map the sequence of events and activities with the received topographical threat map to detect a pattern match corresponding to a malware. In some embodiments, the sequence monitor 204 may overlay the correlated flow of events and activities with the topographic threat map so as to check for the pattern match. In other words, the sequence monitor 204 may determine whether the determined sequence of events and activities is analogous to or similar to a sequence of event and activities demonstrated by the malware using the topographical threat map. If the pattern match is detected, the anomaly (i.e., suspicious sequence of events and activities) is reported to the cognitive engine 205.

The cognitive engine 205 may employ deep-learning algorithms to build behavioral profiles for different malwares, and, in some embodiments, different versions or variations of different malwares. The cognitive engine 205 may connect to internal data sources (e.g., database of security device with historic knowledge of malwares, enterprise security database, etc.) or external data sources (e.g., Internet with external knowledge of malwares) for continuous learning of new threats and patterns of malwares. The cognitive engine 205 may then generate topography threat map based on events and activity of various categories of malware infections. The topographic threat map may have indicators for each critical markers. As one or more critical markers reach a pre-defined corresponding thresholds, a threat level of system may be increased closer to a malware infection. The cognitive engine 205 may determine a pattern match based on the inputs received from sequence monitor 204 that monitors the critical markers. The cognitive engine may then effect a remedial measure to prevent the malware upon detecting the pattern match corresponding to the malware. For example, the cognitive engine 205 may instruct the remediation controller 206 to construct a remediation package (e.g., remedial instructions) based on the profile of the malware, and push the remediation package to the system processor 207 for preventing the malware. As will be appreciated, such remedial measure may be effected in real-time. The remedial measures may include, but are not limited to, suspending the instructions being executed by the processor (i.e., blocking the execution of the malware), suspending the plurality of events, blocking the plurality of activities, or undoing the changes made by the malware.

It should be noted that, in some embodiments, the cognitive engine 205 may prompt the remedial measure based on the predicted security threat. The cognitive engine 205 may, therefore, dynamically determining a security risk score and a security threat zone for a set of events from the monitored events and a set of activities from monitored activities, and predict a security threat based on the security risk score and the security threat zone. Thus, the cognitive engine 205 employ risk scores based on deep learning algorithm to take decision for remediation. As will be appreciated, the deep learning algorithm employing dynamic scoring system based on the sequence of events and activities observed by the event monitor 201 and the activity monitor 202 would reduce false positives or false negatives. By way of an example, a representative table with security risk score, security risk zone, weightages for observed events and observed activities as provided by the deep learning algorithm, predicted security threat, and remediation action triggered as generated and recorded by the cognitive engine 205 is provided in Table A below:

TABLE A

| Dynamic Security Risk Score | Dynamic Security Risk Zone | Deep Learning Algorithm Weightage | | Predicted Security Threat | Remediation Action Triggered |
|---|---|---|---|---|---|
| | | Event Observed | Activities Observed | | |

Figure 3:
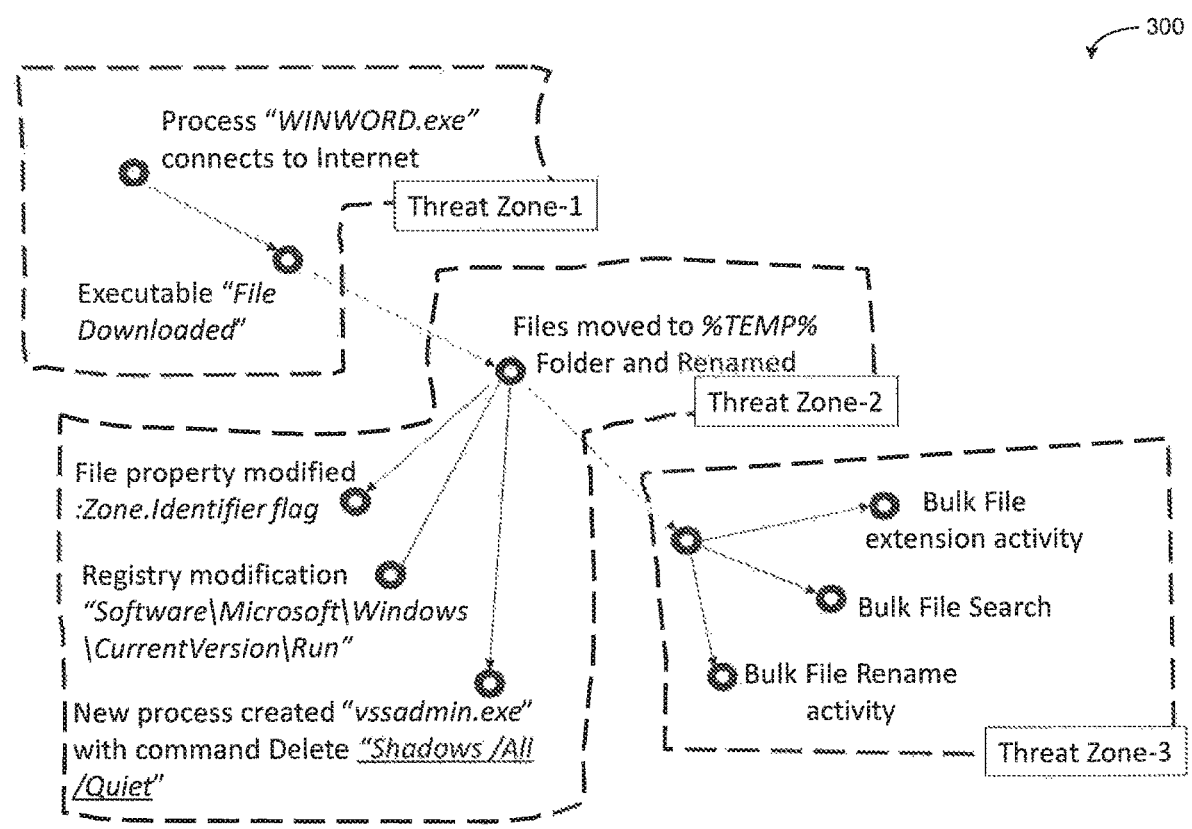
FIG. 3 is a graphical representation of an exemplary topographical threat map of a malware in accordance with some embodiments of the present disclosure.

Referring now to FIG. 3, a graphical representation of an exemplary topographical threat map 300 of a malware, generated by the cognitive engine 205, is illustrated in accordance with some embodiments of the present disclosure. As illustrated, the topographical threat map 300 includes a sequence of events and activities with a corresponding and increasing threat zones. As a set of events and activities are triggered or performed by execution of certain instructions by the system processor 207, they are recorded by the event monitor 201, the activity monitor 202, and the OPCODE trapper 203, and assessed by the sequence monitor 204, and the cognitive engine 205 in real-time based on the topographical threat map 300. Further, if one or more events and activities are classified under increasing threat zones (i.e., from Threat Zone-1 to Threat Zone-2 to Threat Zone-3), the predicted security threat for the system increases accordingly for the malware infection. Upon predicting the increased security threat, the cognitive engine 205 may in real-time effect a remedial measure, via the remediation controller 206, to prevent the malware.

Referring back to FIG. 2, the remediation controller 206 may receive a trigger for the remedial measure from the cognitive engine 205 based on the topographical threat map. The remediation controller 206 may then prepare machine language instructions and inject the same the system processor 207, either directly or through the OPCODE trapper 203, for execution. As will be appreciated, since the machine language OPCODE changes based on type of processor and version, in some embodiments, the remediation controller 206 may construct injects that may then be sent to the OPCODE trapper 203 for execution by the system processor 207.

Each of the connecters, C1-C8, may transfer data between any two modules 201-206 or between a module 201-206 and the system processor 207 using standard wired or wireless data connections means. For example, each of the connecters, C1-C8, may employ one or more connection protocols including, but not limited to, serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc.

It should be noted that the cognitive security device 200 may be implemented in programmable hardware devices such as programmable gate arrays, programmable array logic, programmable logic devices, and so forth. Alternatively, the cognitive security device 200 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for generating cognitive security intelligence for detecting and preventing malwares in computing systems. For example, the exemplary system 100 and the associated cognitive security device 200 may generate cognitive security intelligence for detection and prevention of malwares in the computing systems by the processes discussed herein. In particular, as will be appreciated by those of ordinary skill in the art, control logic and/or automated routines for performing the techniques and steps described herein may be implemented by the system 100 and the associated cognitive security device 200, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 4:
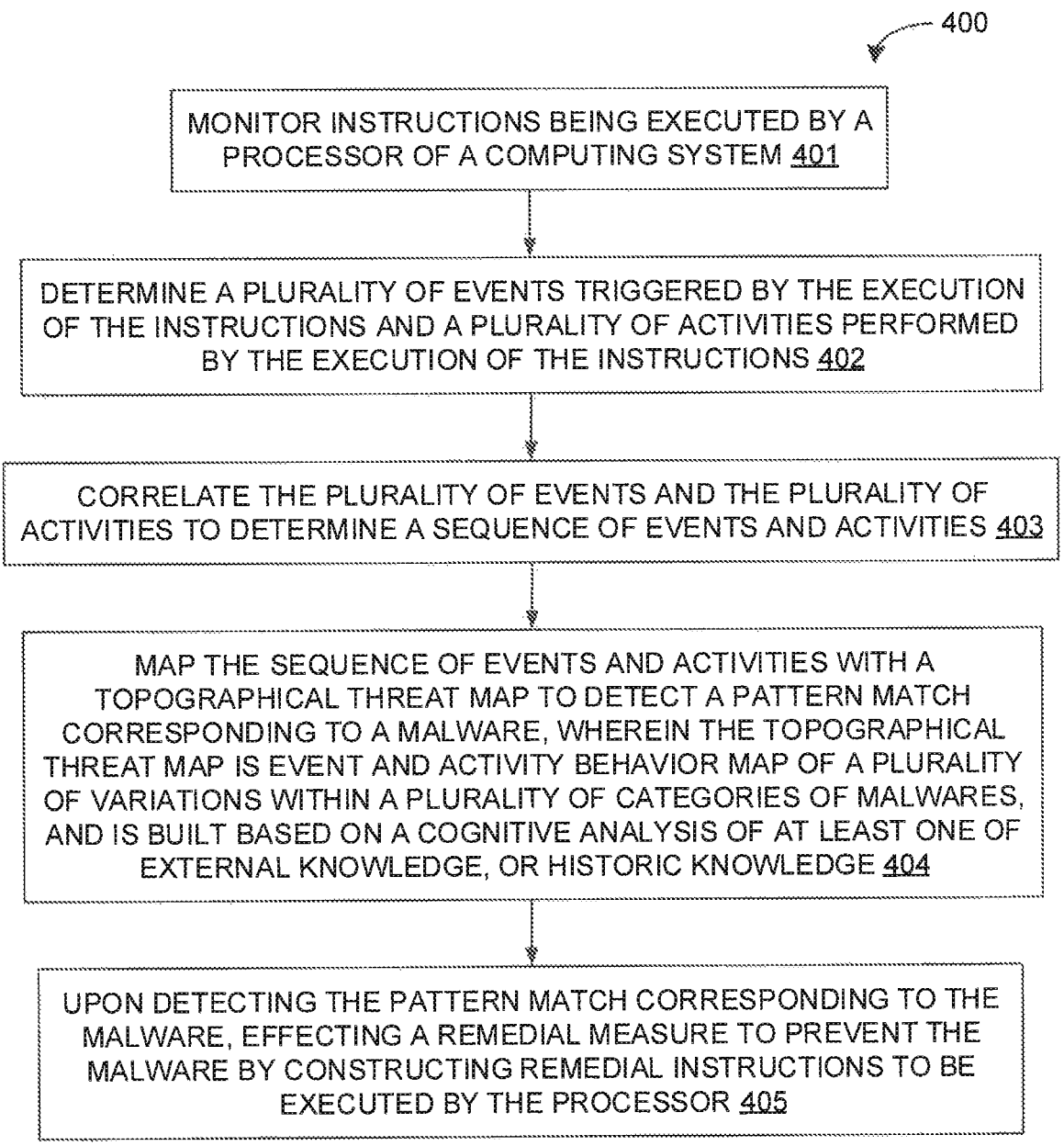
FIG. 4 is a flow diagram of an exemplary process for generating cognitive security intelligence for detecting and preventing malwares in accordance with some embodiments of the present disclosure.

For example, referring now to FIG. 4, exemplary control logic 400 for generating cognitive security intelligence for detecting and preventing a malware in a computing system, such as system 100, is depicted via a flowchart in accordance with some embodiments of the present disclosure. As illustrated in the flowchart, the control logic 400 may include the steps of monitoring instructions being executed by a processor of the computing system at step 401, determining a plurality of events triggered by the execution of the instructions and a plurality of activities performed by the execution of the instructions at step 402, correlating the plurality of events and the plurality of activities to determine a sequence of events and activities at step 403, mapping the sequence of events and activities with a topographical threat map to detect a pattern match corresponding to the malware at step 404, and effecting a remedial measure, upon detecting the pattern match corresponding to the malware, to prevent the malware by constructing remedial instructions to be executed by the processor at step 405.

It should be noted that the topographical threat map may be event and activity behavior map of a plurality of categories of malwares, and may be built based on a cognitive analysis of at least one of external knowledge, or historic knowledge. In some embodiments, the plurality of events may include at least one of device processes, device services, or registry. Additionally, in some embodiments, the plurality of activities may include activities performed on at least one of memory, data, files, folders, or system configuration. Further, in some embodiments, the malware may be a ransomware having no pre-configured signature in the cognitive security device. Moreover, in some embodiments, the remedial measure may include at least one of suspending the instructions being executed by the processor, suspending the plurality of events, blocking the plurality of activities, or undoing the changes made by the malware.

In some embodiments, monitoring the instructions being executed by the processor at step 401 may include replicating the machine code instructions being executed by the processor. Additionally, in some embodiments, detecting the pattern match while performing mapping at step 404 may include determining whether the sequence of events and activities is analogous to a sequence of event and activities demonstrated by the malware using the topographical threat map. Further, in some embodiments, mapping the sequence of events and activities with the topographical threat map at step 404 may include the steps of dynamically determining a security risk score and a security threat zone for a set of events from the plurality of events and a set of activities from the plurality of activities, and predicting a security threat based on the security risk score and the security threat zone. Moreover, in some embodiments, effecting the remedial measure at step 405 may include effecting the remedial measure based on the predicted security threat.

Figure 5:
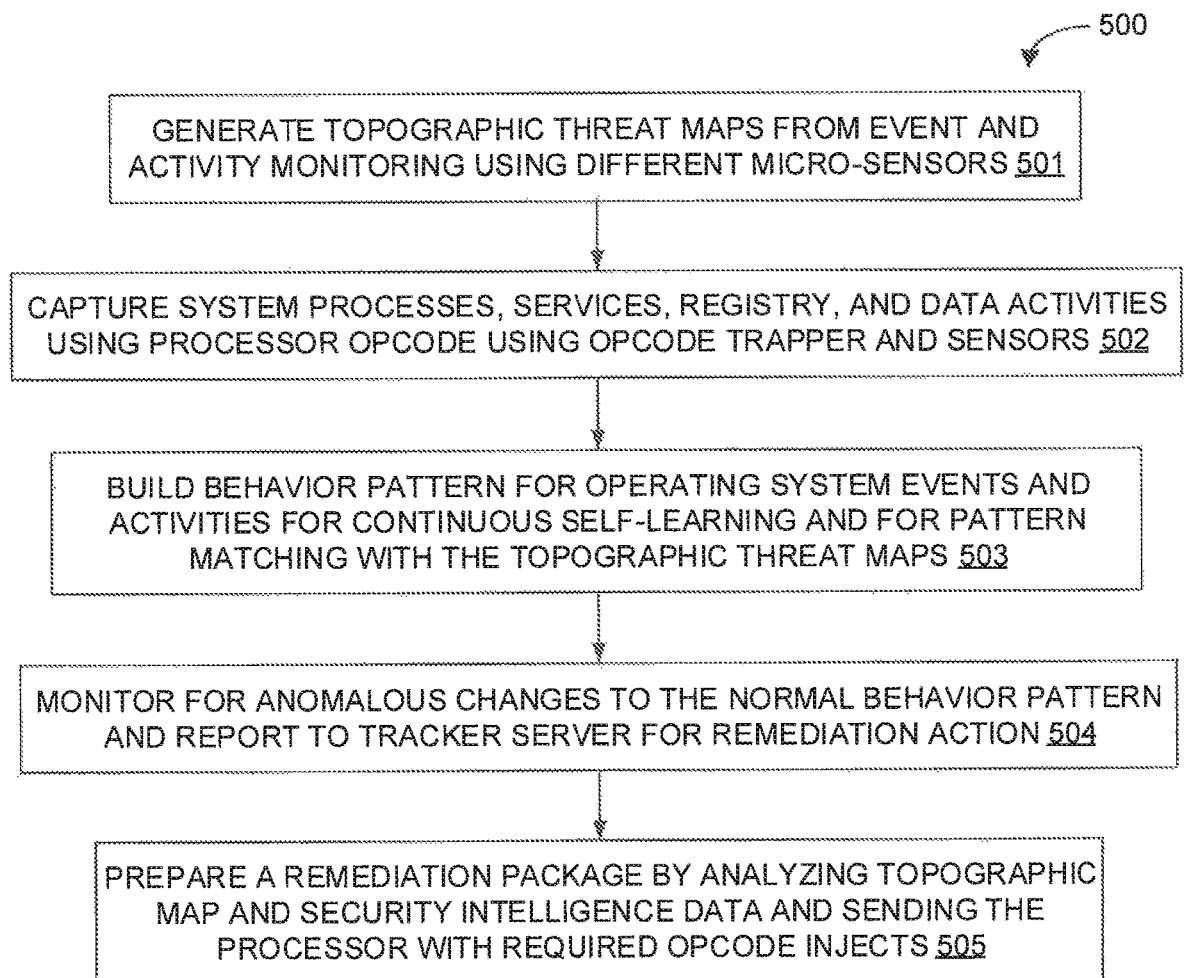
FIG. 5 is a flow diagram of a detailed exemplary process for generating cognitive security intelligence for detecting and preventing malwares in accordance with some embodiments of the present disclosure.

Referring now to FIG. 5, exemplary control logic 500 for generating cognitive security intelligence for detecting and preventing malwares in computing systems is depicted in greater detail via a flowchart in accordance with some embodiments of the present disclosure. As illustrated in the flowchart, at step 501, the control logic 500 may generate topographic threat maps from event and activity monitoring using different micro-sensors. The cognitive engine 205 may use the micro-sensors 201-1-201-6 and 201-1-202-3 available as part of the monitoring sensors (i.e., event monitor 201 and activity monitor 202) to generate topographical threat maps. The cognitive engine 205 may also employ external data sources (e.g., Internet) to generate the topographic threat maps. In other words, the cognitive engine 205 may build topographical threat maps (i.e., event and activity behavior map of different categories of malwares) based on a cognitive analysis of historic knowledge as well as external knowledge. The generated topographical threat maps may be utilized by the sequence monitor 204 and the cognitive engine 205 to detect and prevent malwares. The sequence monitor 204 may receive the topographical threat maps from the cognitive engine 205. The sequence monitor 204 may then analyze and correlate the events and activities against this preloaded cognitive engine generated topographic threat maps. Each match with the topographical threat map may be monitored, and the data will be real-time fed into the cognitive engine 205 for prediction of security threat level and implementation of appropriate remedial measures. As noted above, critical sections of threat events and activities may be monitored for their effect on temporary folders, system processes, registry, critical system files, and so forth.

At step 502, the control logic 500 may capture system processes, services, registry, and data activities using processor OPCODE using OPCODE trapper 203 and monitoring sensors 201 and 202. Both the monitoring sensors (i.e., event monitor 201 and activity monitor 202) may interface in real-time with the OPCODE trapper 203 and capture processor level instructions. The data may then be analyzed to determine events triggered by the instructions and activities performed by the instructions. The analyzed data may then be shared with the sequence monitor 204 for mapping with the topographic threat map. It should be noted that each of the event monitor 201 and the activity monitor 202 may have separate interface to connect to the OPCODE trapper 203 and the sequence monitor 204 respectively. Based on the type of monitor (i.e., event or activity), the deep-learning algorithm may be enabled to understand and analyze the codes. As will be appreciated, the micro-sensors may be feeder to the event monitoring platform and the activity monitoring platform.

At step 503, the control logic 500 may build behavior pattern for operating system events and activities for continuous self-learning and for pattern matching with the topographic threat maps. The event and activity monitoring platforms 201 and 202 (including individual sensors or micro-sensors), the OPCODE trapper 203, and the sequence monitor 204 may interface with the cognitive engine 205 to enable machine-learning capability onto each of the above module. This will support in continuous self-learning of the system environment, thus enabling each agent and modules to work independently and reduce latency occurring due to consistent communication.

At step 504, the control logic 500 may monitor for anomalous changes to the normal behavior pattern and report to the cognitive engine for remediation action. The event and activity-monitoring platform 201 and 202 may collate system events and user actions behavior details in real-time. In some embodiments, the monitoring platform 201 and 202 may provide the container space for micro-sensors 201-1-201-5 and 202-1-202-3, which may then monitor the OPCODEs of system events and user actions in real-time. This data may then be analyzed by the sequence monitor 204 using the machine-learning algorithm, to check for any anomaly. If any anomaly detected is detected, the information may be fed into the deep learning algorithm in-built in the sequence monitor 204 to check if sequence of events and activities detected is anomaly or not. If any anomaly is detected in the sequence of events and activities, the information may be further fed to the cognitive engine 205 for further and deeper anomaly analysis.

At step 505, the control logic 500 may prepare a remediation package by analyzing topographic threat map and security intelligence data, and sending to the processor with required OPCODE injects. Each of the events and activities may correspond to a defined threat zone, and the cognitive engine may accordingly invoke self-healing to prevent or block execution of malicious instructions, suspend events, block activities, undo registry modification, and so forth. The cognitive engine 205 may interface with remediation controller 206 to define threat maps and push to each of the agents and sensors. The remediation controller 206 may prepare machine language instructions and inject the same in system processor 207 for execution. Since the machine language OPCODE may change based on type of processor and version, remediation controller 206 may primarily construct injects, which may then be sent to the OPCODE trapper 203 for execution on the system processor 207.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
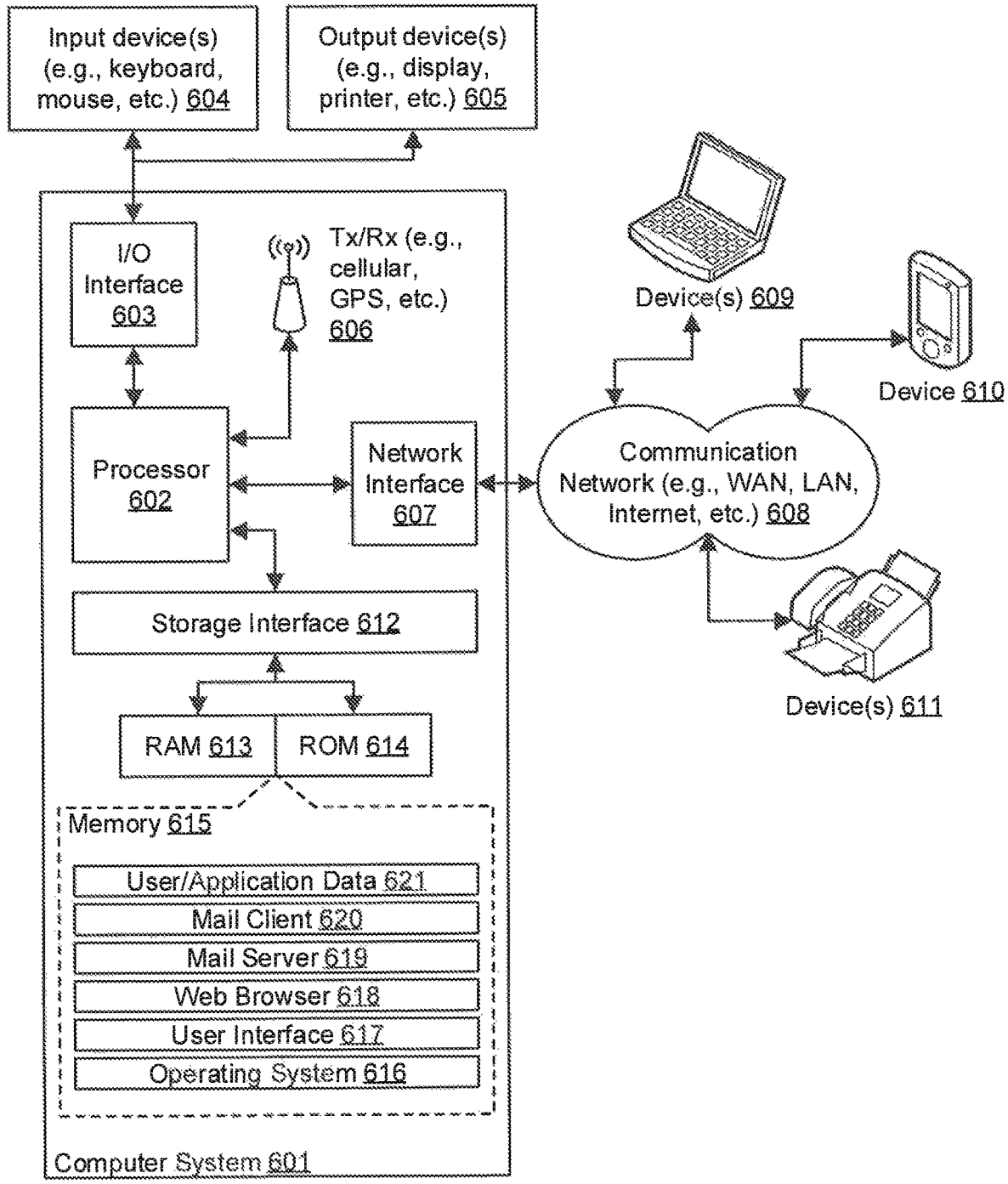
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing system 100 for generating cognitive security intelligence for detecting and preventing malwares. Computer system 601 may include a central processing unit ("CPU" or "processor") 602. Processor 602 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), RF antennas, S-Video, video graphics array (VGA), IEEE 802.n/b/g/n/x, Bluetooth, cellular (e.g., code-division multiple access (CDMA), high-speed packet access (HSPA+), global system for mobile communication (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 601 may implement a web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as Apple Mail, Microsoft Entourage, Microsoft Outlook, Mozilla Thunderbird, etc.

In some embodiments, computer system 601 may store user/application data 621, such as the data, variables, records, etc. (e.g., events, activities, sequence of events and activities, topographical threat map, remedial measures, security risk scores, security threat zones, predicted security threat, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for cost effective and efficient generation of cognitive security intelligence for detecting and preventing malwares in computing systems. In particular, the techniques provide for detection and prevention of unsolicited encryption of computer files in a computer system, particularly as a result of operation of ransomware in the computer system. The techniques provide for end-to-end management of security threats with high efficiency in detection and prevention of malicious file execution. Additionally, the techniques require minimal human intervention in the entire lifecycle. The techniques described in the embodiments discussed above further provide for high-level of customization to the users or enterprises so as to define monitoring thresholds, teach threat patterns, remediation action, and reporting. Additionally, the techniques may be easily scalable with addition of modular sensors for detecting more events and activities.

Further, as will be appreciated by those skilled in the art, the techniques describe in the various embodiments discussed above is context aware and have contextual understanding of the events and activities occurring in the operating system environment. Additionally, the techniques employ cognitive pattern learning of system events and data activity for monitoring, detection, and remediation of malwares. Further, the techniques provide for speedy and real-time detection and prevention. As will be appreciated, the malwares, and in particular ransomwares, may execute very fast and encrypt all the files in system in less than a minute. The techniques described in the embodiments discussed above is designed to trap details of malicious execution at processor level using machine language instructions, thereby enabling real-time detection and prevention. Additionally, the techniques employ deep learning algorithm to predict security threat from malwares much before a malware infection begins encryption of files, data, or system configuration.

As will be appreciated, the techniques described in the embodiments discussed above employ behavior of the system events and data activity for detection of malwares. In particular, the detection is based on deep learning of behavioral pattern (i.e., predefined set of behaviors) indicative of malwares. In other words, the techniques provide for non-signature based detection of malwares. Thus, if the techniques identify any sequence of a set of events followed by a set of activities as malicious, the techniques may automatically send required machine learning instructions to the processor for remedial action such as for suspending the instruction being executed by the processor. In short, the techniques provide for real-time detection using events or actions as and when it occurs in the computing system and doesn't depend on logs generated by any network devices. Further, the techniques employ cognitive intelligence using deep learning of the system events and data activity for anomaly detection. The techniques do not require large learning datasets, and may, therefore, detect new malware threats.

The specification has described method and system for method and system for generating cognitive security intelligence for detecting and preventing malwares in computing systems. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of generating cognitive security intelligence for detecting and preventing a non-signature based malware in a computing system, the method comprising:
   monitoring, by a cognitive security device implemented in the computing system, instructions being executed by a processor of the computing system;
   determining, by the cognitive security device, a plurality of events triggered by the execution of the instructions and a plurality of activities performed by the execution of the instructions
   correlating, by the cognitive security device, the plurality of events and the plurality of activities to determine a sequence of events and activities of the non-signature based malware,
      wherein the plurality of events comprises: file dropping and execution, device fingerprinting, system vulnerability exploitation, system cryptic processes, bulk file search, and voluminous network events in the computing system, and
   wherein the plurality of activities comprise: re-writing boot sectors of Master Boot Record (MBR), bulk file extension change, bulk file name change, folder name change, system file zoning flag modification, system boot run registry, deletion of volume shadow copies, modification to security center notifications, disabling of windows error recovery on startup, and scheduling of system reboot in the computing system;
   mapping, by the cognitive security device, the sequence of events and activities with a topographical threat map to detect a pattern match corresponding to the non-signature based malware,
   wherein the non-signature based malware is having no pre-configured signature in the cognitive security device,
   wherein the topographical threat map is event and activity behavior map of a plurality of categories of malwares, and is built based on a cognitive analysis of historic knowledge and external data source that is connected to Internet for continuous learning of new threats and patterns of a plurality of categories of malwares,
   wherein the topographical threat map defines a plurality of security-threat-zones that vary for each event and an associated activity of the plurality of categories of malwares, and wherein each security-threat-zone is indicative of whether a threat level of each event and an associated activity has an increased likelihood of being closer to the successful infection on the computing system or not, based on a predefined threshold,
   wherein mapping further comprises dynamically determining a security risk score and a security threat zone for a set of events from the plurality of events and a set of activities from the plurality of activities;
   predicting, by the cognitive security device, a security threat indicating that a correlated flow of an event and an activity is associated with a security-threat-level that is closer to the successful malware-infection or not, based on the security risk score and the security threat zone, before any successful infection takes place on the computing system,
   wherein a deep learning algorithm is employed to predict security threat, wherein each pattern match with the topographical threat map is utilized to predict the security threat; and
   upon detecting the pattern match corresponding to the non-signature based malware, effecting, by the cognitive security device, a remedial measure to prevent the non-signature based malware by constructing remedial instructions to be executed by the processor based on a profile of the non-signature based malware and the security-threat-level of the predicted security threat, wherein the security risk score is employed based on a deep learning algorithm to take the remedial measure.

2. The method of claim 1, wherein monitoring the instructions being executed by the processor further comprises replicating machine code instructions being executed by the processor.

3. The method of claim 1, wherein the plurality of events is associated to device processes, device services, or registry.

4. The method of claim 1, wherein the plurality of activities comprises activities performed on at least one of memory, data, files, folders, or system configuration.

5. The method of claim 1, wherein detecting the pattern match comprises determining whether the sequence of events and activities is analogous to a sequence of event and activities demonstrated by the malware using the topographical threat map.

6. The method of claim 1, wherein the remedial measure comprises at least one of suspending the instructions being executed by the processor, suspending the plurality of events, blocking the plurality of activities, or undoing the changes made by the non-signature based malware.

7. A computing system, comprising:
   a cognitive security device for generating cognitive security intelligence for detecting and preventing a non-signature based malware in the computing system, the cognitive security device comprising at least one processor and a computer-readable medium storing instructions that, when executed by the at least one processor, cause the at least one processor to perform operations comprising:
   monitoring instructions being executed by a processor of the computing system;

determining a plurality of events triggered by the execution of the instructions and a plurality of activities performed by the execution of the instructions;

correlating the plurality of events and the plurality of activities to determine a sequence of events and activities of the non-signature based malware, wherein the plurality of events comprises: file dropping and execution, device fingerprinting, system vulnerability exploitation, system cryptic processes, bulk file search, and voluminous network events in the computing system, and wherein the plurality of activities comprise: re-writing boot sectors of Master Boot Record (MBR), bulk file extension change, bulk file name change, folder name change, system file zoning flag modification, system boot run registry, deletion of volume shadow copies, modification to security center notifications, disabling of windows error recovery on startup, and scheduling of system reboot in the computing system;

mapping the sequence of events and activities with a topographical threat map to detect a pattern match corresponding to the non-signature based malware, wherein the non-signature based malware is having no pre-configured signature in the cognitive security device, wherein the topographical threat map is event and activity behavior map of a plurality of categories of malwares, and is built based on a cognitive analysis of historic knowledge and external data source that is connected to Internet for continuous learning of new threats and patterns of a plurality of categories of malwares, wherein the topographical threat map defines a plurality of security-threat-zones that vary for each event and an associated activity of the plurality of categories of malwares, and wherein each security-threat-zone is indicative of whether a threat level of each event and an associated activity has an increased likelihood of being closer to the successful infection on the computing system or not, based on a predefined threshold, wherein mapping further comprises dynamically determining a security risk score and a security threat zone for a set of events from the plurality of events and a set of activities from the plurality of activities;

predicting, by the cognitive security device, a security threat indicating that a correlated flow of an event and an activity is associated with a security-threat-level that is closer to the successful malware-infection or not, based on the security risk score and the security threat zone, before any successful infection takes place on the computing system, wherein a deep learning algorithm is employed to predict security threat, wherein each pattern match with the topographical threat map is utilized to predict the security threat; and upon detecting the pattern match corresponding to the non-signature based malware, effecting a remedial measure to prevent the malware by constructing remedial instructions to be executed by the processor based on a profile of the non-signature based malware and the security-threat-level of the predicted security threat, wherein the security risk score is employed based on a deep learning algorithm to take the remedial measure.

8. The system of claim 7, wherein monitoring the instructions being executed by the processor of the computing system further comprises replicating machine code instructions being executed by the processor of the computing system.

9. The system of claim 7, wherein the plurality of events comprises is associated with device processes, device services, or registry, and wherein the plurality of activities comprises activities performed on at least one of memory, data, files, folders, or system configuration.

10. The system of claim 7, wherein detecting the pattern match comprises determining whether the sequence of events and activities is analogous to a sequence of event and activities demonstrated by the malware using the topographical threat map.

11. The system of claim 7, wherein the remedial measure comprises at least one of suspending the instructions being executed by the processor, suspending the plurality of events, blocking the plurality of activities, or undoing the changes made by the malware.

12. A non-transitory computer-readable medium storing computer-executable instructions for:

monitoring instructions being executed by a processor of a computing system;

determining a plurality of events triggered by the execution of the instructions and a plurality of activities performed by the execution of the instructions;

correlating the plurality of events and the plurality of activities to determine a sequence of events and activities of a non-signature based malware, wherein the plurality of events comprises: file dropping and execution, device fingerprinting, system vulnerability exploitation, system cryptic processes, bulk file search, and voluminous network events in the computing system, and wherein the plurality of activities comprise: re-writing boot sectors of Master Boot Record (MBR), bulk file extension change, bulk file name change, folder name change, system file zoning flag modification, system boot run registry, deletion of volume shadow copies, modification to security center notifications, disabling of windows error recovery on startup, and scheduling of system reboot in the computing system;

mapping the sequence of events and activities with a topographical threat map to detect a pattern match corresponding to the non-signature based malware, wherein the non-signature based malware is having no pre-configured signature in the cognitive security device, wherein the topographical threat map is event and activity behavior map of a plurality of categories of malwares, and is built based on a cognitive analysis of historic knowledge and external data source that is connected to Internet for continuous learning of new threats and patterns of a plurality of categories of malwares, wherein the topographical threat map defines a plurality of security-threat-zones that vary for each event and an associated activity of the plurality of categories of malwares, and wherein each security-threat-zone is indicative of whether a threat level of each event and an associated activity has an increased likelihood of being closer to the successful infection on the computing system or not, based on a predefined threshold, wherein mapping further comprises dynamically determining a security risk score and a security threat zone for a set of events from the plurality of events and a set of activities from the plurality of activities;

predicting, by the cognitive security device, a security threat indicating that a correlated flow of an event and an activity is associated with a security-threat-level that is closer to the successful malware-infection or not, based on the security risk score and the security threat zone, before any successful infection takes place on the computing system, wherein a deep learning algorithm is employed to predict security threat, wherein each pattern match with the topographical threat map is utilized to predict the security threat; and upon detecting the pattern match corresponding to the non-signature based malware, effecting a remedial measure to prevent the non-signature based malware by constructing remedial instructions to be executed by the processor based on a profile of the malware and the security-threat-level of the predicted security threat, wherein the security risk score is employed based on a deep learning algorithm to take the remedial measure.

13. The non-transitory computer-readable medium of claim 12, wherein monitoring the instructions being executed by the processor of the computing system further comprises replicating the machine code instructions being executed by the processor of the computing system.

14. The non-transitory computer-readable medium of claim 12, wherein detecting the pattern match comprises determining whether the sequence of events and activities is analogous to a sequence of event and activities demonstrated by the malware using the topographical threat map.

* * * * *